(12) United States Patent
Pan et al.

(10) Patent No.: US 11,403,344 B2
(45) Date of Patent: Aug. 2, 2022

(54) TRAVERSING SMART CONTRACT DATABASE THROUGH LOGIC MAP

(71) Applicant: Advanced New Technologies Co., Ltd., George Town (KY)

(72) Inventors: Dong Pan, Hangzhou (CN); Xiaorui Qiao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/390,802

(22) Filed: Apr. 22, 2019

(65) Prior Publication Data

US 2019/0251124 A1 Aug. 15, 2019

Related U.S. Application Data

(63) Continuation of application No. PCT/CN2018/114410, filed on Nov. 7, 2018.

(51) Int. Cl.
*G06F 15/16* (2006.01)
*G06F 16/901* (2019.01)
(Continued)

(52) U.S. Cl.
CPC ........ *G06F 16/9027* (2019.01); *G06F 16/901* (2019.01); *G06F 16/9017* (2019.01); *H04L 9/0637* (2013.01); *H04L 9/0836* (2013.01)

(58) Field of Classification Search
CPC ............. G06F 16/9027; G06F 16/9017; H04L 9/0637; H04L 9/0836
See application file for complete search history.

(56) References Cited

U.S. PATENT DOCUMENTS

| 2010/0010989 A1 | 1/2010 | Li et al. |
| 2013/0124545 A1 | 5/2013 | Holmberg et al. |

(Continued)

FOREIGN PATENT DOCUMENTS

| CN | 107103098 | 8/2017 |
| CN | 108615156 | 10/2018 |

(Continued)

OTHER PUBLICATIONS

Subasri Mathiyalahan, et al. "Data Integrity Verification Using MPT (Merkle Patricia Tree) in Cloud Computing" (International Journal of Engineering & Technology), Abstract and Parts 2-3, Feb. 24, 2018 (Year: 2018).*

(Continued)

*Primary Examiner* — Tony Mahmoudi
*Assistant Examiner* — Erich Alexander Fischer
(74) *Attorney, Agent, or Firm* — Fish & Richardson P.C.

(57) ABSTRACT

Implementations of the present disclosure include determining a first number of an index corresponding to one of a first one or more key-value pairs (KVPs) of a Merkle Patricia Tree (MPT) used by a smart contract database; determining, based on the first number of the index, a first key of a first KVP of a second one or more KVPs of a map for traversing the MPT; determining a first value corresponding to the first key of the first KVP; determining a second key of a second KVP of the second one or more KVPs; and retrieving the second value corresponding to the second key of the second KVP.

20 Claims, 6 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 2014/0181039 A1 | 6/2014 | Harrison et al. | |
| 2016/0092988 A1 | 3/2016 | Letourneau | |
| 2017/0255950 A1* | 9/2017 | Krug | G06N 7/005 |
| 2017/0262461 A1* | 9/2017 | Androulaki | G06F 16/28 |
| 2018/0075028 A1 | 3/2018 | Ruschin et al. | |
| 2018/0117446 A1 | 5/2018 | Tran et al. | |

FOREIGN PATENT DOCUMENTS

| | | |
|---|---|---|
| JP | 2016177688 | 10/2016 |
| WO | WO 2017145009 | 8/2017 |
| WO | WO 2017149388 | 9/2017 |
| WO | WO 2018056992 | 3/2018 |
| WO | WO 2018059939 | 4/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Mathiyalahan et al., "Data Integrity Verification Using MPT (Merkle Patricia Tree) in Cloud Computing," International Journal of Engineering & Technology, Feb. 2018, 7(2.24): 500-503.
Nakamoto, "Bitcoin: A Peer-to-Peer Electronic Cash System," www.bitcoin.org, 2005, 9 pages.
PCT International Search Report and Written Opinion in International Application No. PCT/CN2018/114410, dated Aug. 6, 2019, 7 pages.
Extended European Search Report in European Application No. 18866631.7, dated Nov. 15, 2019, 12 pages.
Wikipedia, "Smart contract", Oct. 2018, retrieved on Nov. 7, 2019, retrieved from URL<https://en.wikipedia.org/w/indexi 11e=Smart_contract&oldi d=865760563>, 5 pages.
Wood, "Etherum: A Secure Decentralised Generalised Transaction Ledger Final Draft-Under Review", Jun. 2014, Chapter 1, Chapter 4, appendix, 31 pages.

* cited by examiner

400

402

| key | value |
|---|---|
| Alice | 22 |
| Bob | 23 |

404

| hash(key) | value |
|---|---|
| a1ac | 22 |
| a54c | 23 |

406

| key | value |
|---|---|
| Dict_A_KEY_VALUE_Alice | 22 |
| Dict_A_KEY_INDEX_Alice | 1 |
| Dict_A_KEY_DELETE_Alice | False |
| Dict_A_KEY_VALUE_Bob | 23 |
| Dict_A_KEY_INDEX_Bob | 2 |
| Dict_A_KEY_DELETE_Bob | False |
| Dict_A_INDEX_KEY_1 | Alice |
| Dict_A_INDEX_KEY_2 | Bob |
| Dict_A_SIZE | 2 |
| Dict_A_LENGTH | 2 |

408

| hash(key) | value |
|---|---|
| a2af | 22 |
| a111 | 1 |
| a122 | False |
| a123 | 23 |
| a154 | 2 |
| a187 | False |
| a119 | Alice |
| a1e3 | Bob |
| a1f3 | 2 |
| a172 | 2 |

FIG. 4

TRAVERSING SMART CONTRACT DATABASE THROUGH LOGIC MAP

CROSS-REFERENCE TO RELATED APPLICATIONS

This application is a continuation of PCT Application No. PCT/CN2018/114410, filed on Nov. 7, 2018, which is hereby incorporated by reference in its entirety.

BACKGROUND

Blockchain networks, which can also be referred to as blockchain systems, consensus networks, distributed ledger system (DLS) networks, or blockchain, enable participating entities to securely, and immutably store data. A blockchain can be described as a ledger of transactions and multiple copies of the blockchain are stored across the blockchain network. Example types of blockchains can include public blockchains, consortium blockchains, and private blockchains. A public blockchain is open for all entities to use the blockchain, and participate in the consensus process. A consortium blockchain is a blockchain where the consensus process is controlled by a pre-selected set of nodes. A private blockchain is provided for a particular entity, which centrally controls read and write permissions.

A smart contract can be a computer code running on top of a blockchain. The smart contract can include a set of predetermined rules that the parties to the smart contract agreed to interact with each other. When the predetermined rules are met, the agreement can be automatically enforced. Smart contracts are encoded, and executed within a blockchain platform. An example blockchain platform includes, without limitation, Ethereum provided by the Ethereum Foundation of Zug, Switzerland. In some blockchain platforms, such as Ethereum, a state machine can be used, where transactions can result in transitions between states. A state can be expressed as a key-value pair (KVP). In some cases, Merkle Patricia Tree (MPT) is used as a method to save KVPs. The size of a MPT can increase with the number of KVPs. To perform operations such as traverse, read, or remove KVPs, the corresponding keys of the KVPs need to be known by a user. The efficiency of the operations can decrease with the increase of the MPT size.

SUMMARY

Implementations of the present disclosure are directed to traversing one or more key-value pairs (KVPs) of a Merkle Patricia Tree (MPT) used by a smart contract database based on a logic map. More particularly, implementations of the present disclosure are directed to configuring a logic map that includes a plurality of functions. The functions can be used to manipulate a plurality of KVPs for traversing the one or more KVPs in the MPT.

In some implementations, actions include determining a first number of an index corresponding to one of a first one or more key-value pairs (KVPs) of a Merkle Patricia Tree (MPT) used by a smart contract database; determining, based on the first number of the index, a first key of a first KVP of a second one or more KVPs of a map for traversing the MPT; determining a first value corresponding to the first key of the first KVP; determining a second key of a second KVP of the second one or more KVPs; and retrieving the second value corresponding to the second key of the second KVP. Other implementations include corresponding systems, apparatus, and computer programs, configured to perform the actions of the methods, encoded on computer storage devices.

These and other implementations may each optionally include one or more of the following features: determining, based on a second number of the index, a third key of a third KVP of the second one or more KVPs; determining a third value corresponding to the third key of the third KVP; determining a fourth key of a fourth KVP of the fourth one or more KVPs; retrieving the fourth value corresponding to the fourth key of the fourth KVP; The computer-implemented method of claim 2, further comprising determining that the second number of the index is not deleted; a number of KVPs in the first one or more KVPs is less than or equal to a number of KVPs in the second one or more KVPs; keys of the first one or more KVPs and keys of the second one or more KVPs are stored as hash value; the second one or more KVPs include one or more values that are the same as one or more values included in the first one or more KVPs, and one or more values that are the same as one or more keys included in the first one or more KVPs; the second one or more KVPs include one or more values indicating numbers included in the index, one or more values indicating whether one of more of the first one or more KVPs are deleted, and a quantity of KVPs in the first one or more KVPs.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 4 depicts example KVPs corresponding to an example logic map and an example MPT in accordance with implementations of the present disclosure.

Like reference symbols in the various drawings indicate like elements.

DETAILED DESCRIPTION

Figure 1:
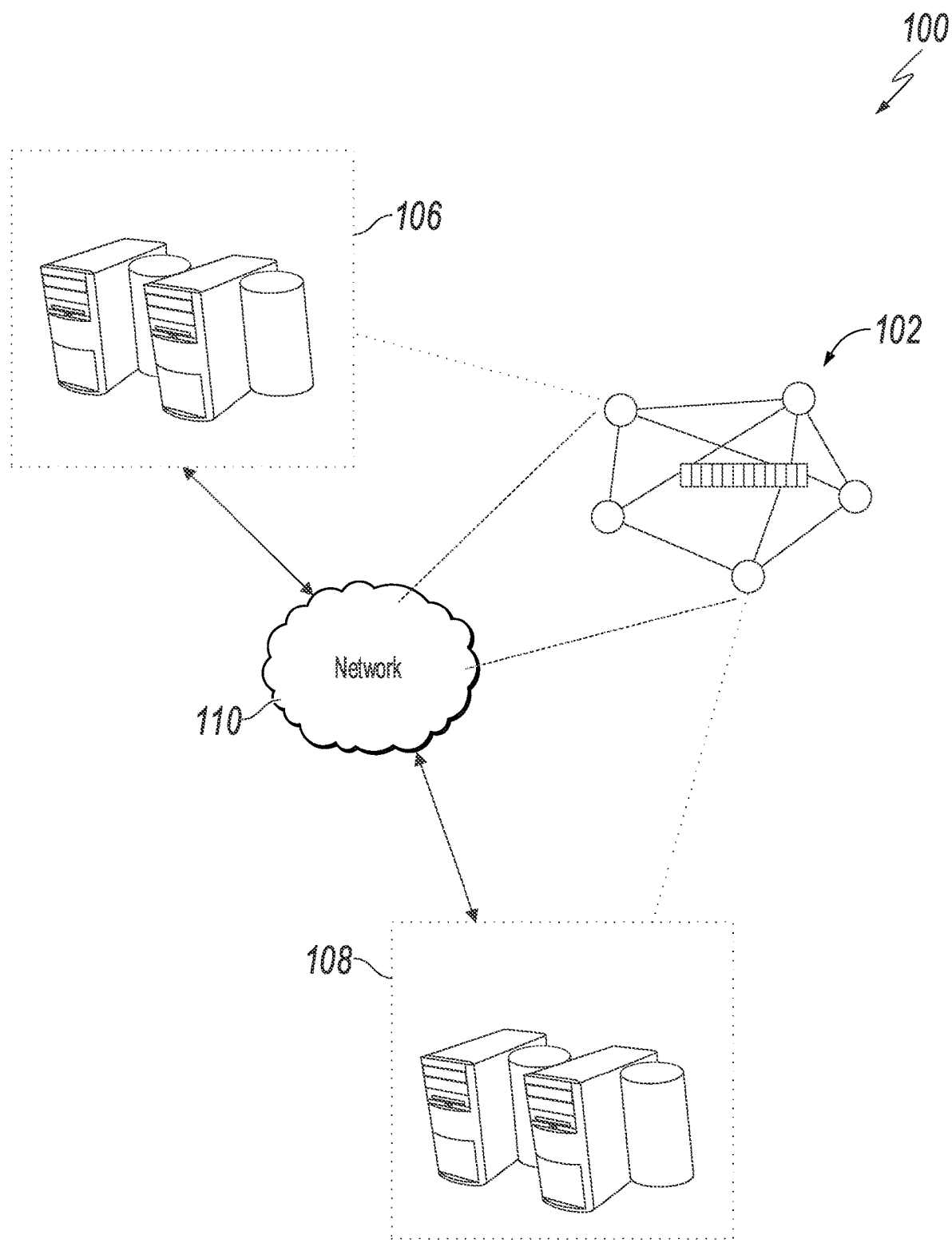
FIG. 1 depicts an example environment that can be used to execute implementations of the present disclosure.

Implementations of the present disclosure are directed to traversing one or more key-value pairs (KVPs) of a Merkle Patricia Tree (MPT) used by a smart contract database based on a logic map. More particularly, implementations of the present disclosure are directed to configuring a logic map that includes a plurality of functions. The functions can be used to manipulate a plurality of KVPs for traversing the one or more KVPs in the MPT.

In some implementations, actions include determining a first number of an index corresponding to one of a first one or more key-value pairs (KVPs) of a Merkle Patricia Tree (MPT) used by a smart contract database; determining, based on the first number of the index, a first key of a first KVP of a second one or more KVPs of a map for traversing the MPT; determining a first value corresponding to the first key of the first KVP; determining a second key of a second KVP of the second one or more KVPs; and retrieving the second value corresponding to the second key of the second KVP.

To provide further context for implementations of the present disclosure, and as introduced above, blockchain networks, which can also be referred to as consensus networks (e.g., made up of peer-to-peer nodes), distributed ledger system, or simply blockchain, enable participating entities to securely and immutably conduct transactions, and store data. Implementations of the present disclosure are described in further detail herein with reference to smart contracts of blockchain networks. It is contemplated, however, that implementations of the present disclosure can be realized in any appropriate blockchain platforms.

In some examples, smart contracts can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network. In some examples, the contract parties can include entities (e.g., business enterprises) that are associated with the smart contract (e.g., as parties to the smart contract).

In some examples, a smart contract can store data, which can be used to record information, facts, associations, balances and any other information needed to implement logic for contract execution. Smart contracts can be described as a computer-executable program consisting of functions, where an instance of the smart contract can be created, and functions invoked for execution of the logic therein. In some examples, a smart contract can include various components, one or more of which can also be described as a contract. In some examples, one or more of the components of the smart contract can be updated as part of an update to the overall smart contract.

In some implementations, example components of a smart contract can include, without limitation, a controller contract, a service contract, and a data contract. The controller contract can be defined by a dispatcher upon receipt of a request by a contract originator, who originates the smart contract. Origination of the smart contract can include providing the smart contract to nodes in the consortium blockchain network (e.g., to the entities, who are to be parties to the smart contract). Origination of the smart contract can also identify a time, at which the smart contract was created, and an identification of the originator of the smart contract. In some examples, the service contract includes logic of the smart contract. The logic can define how the contract is executed, including a definition of an order of events and relationships to entities associated with the smart contract. The data contract includes terms of the smart contract, including, without limitation, products, and/or services that are covered by the smart contract, and payment information for the smart contract for provision of the products, and/or services. Data that is stored in the data contract can be used to record information, facts, and associations including, without limitation, balances, payments, receipts, deliveries, deadlines, and any other information needed to implement logic of the smart contract.

In technical terms, smart contracts can be implemented based on objects and object-oriented classes. For example, terms and components of the smart contract can be represented as objects that are handled by applications implementing the smart contracts. A smart contract (or an object in the smart contract) can call another smart contract (or an object in the same smart contract) just like other object-oriented objects. Calls that are made by an object can be, for example, a call to create, update, delete, propagate, or communicate with objects of another class. Calls between objects can be implemented as functions, methods, application programming interfaces (APIs), or other calling mechanisms. For example, a first object can call a function to create a second object.

Implementations of the present disclosure are directed to traversing one or more KVPs of a MPT used by a smart contract database based on a logic map. More particularly, implementations of the present disclosure are directed to configuring a logic map that includes a plurality of functions. The functions can be used to manipulate a plurality of KVPs for traversing the one or more KVPs in the MPT.

FIG. 1 depicts an example environment 100 that can be used to execute implementations of the present disclosure. In some examples, the example environment 100 enables entities to participate in a public blockchain 102. The example environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain system 102, for storing transactions in a blockchain 104. Example computing devices include, without limitation, a server, a desktop computer, a laptop computer, a tablet computing device, and a smartphone. In some examples, the computing systems 106, 108 host one or more computer-implemented services for interacting with the consortium blockchain system 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain system 102 is represented as a peer-to-peer network of nodes, and the computing systems 106, 108 provide nodes of the first entity, and second entity respectively, which participate in the consortium blockchain system 102.

Figure 2:
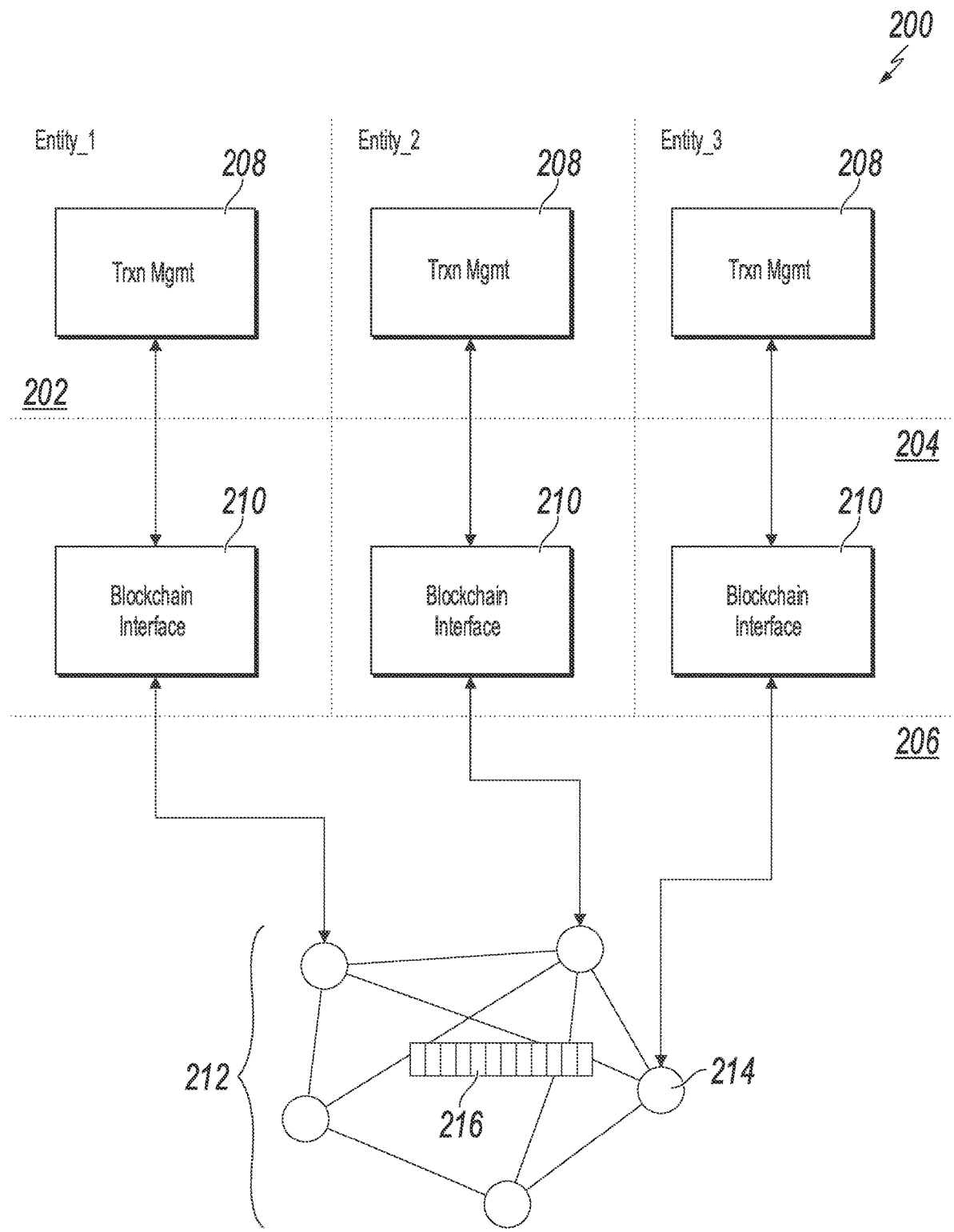
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes blockchain interfaces 210 for each transaction management system 208. In some examples, a respective transaction management system 208 communicates with a respective blockchain interface 210 over a network (e.g., the network 110 of FIG. 1) using a communication protocol (e.g., hypertext transfer protocol secure (HTTPS)). In some examples, each blockchain interface 210 provides a communication connection between a respective transaction management system 208, and the blockchain layer 206. More particularly, each blockchain interface 210 enables the respective entity to conduct transactions recorded in a consortium blockchain system 212 of the blockchain layer 206. In some examples, communication between a blockchain interface 210, and the blockchain layer 206 is conducted using remote procedure calls (RPCs). In some examples, the blockchain interfaces 210 "host" consensus nodes for the respective transaction management systems 208. For example, the blockchain interfaces 210 provide the application programming interface (API) for access to the consortium blockchain system 212.

As introduced above, smart contracts are encoded, and executed within a blockchain platform. An example blockchain platform includes, without limitation, Ethereum provided by the Ethereum Foundation of Zug, Switzerland. Although implementations of the present disclosure are described in further detail herein with reference to Ethereum, it is contemplated that implementations of the present disclosure can be realized in any appropriate platform.

In some blockchain platforms, such as Ethereum, a state machine can be used, where transactions can result in transitions between states. In some cases, states encoded as MPTs for Ethereum blockchains are stored as KVPs. The keys and the values of the KVPs can form a mapping relationship. However, the KVPs may not be traversed based on the mapping relationship alone unless the keys are known. At a high-level, implementations of the present disclosure provide functions to create and operate a logic map that includes a plurality of KVPs. Based on the plurality of KVPs of the logic map, a user can select KVPs of the MPT to traverse or perform other manipulations.

Figure 3:
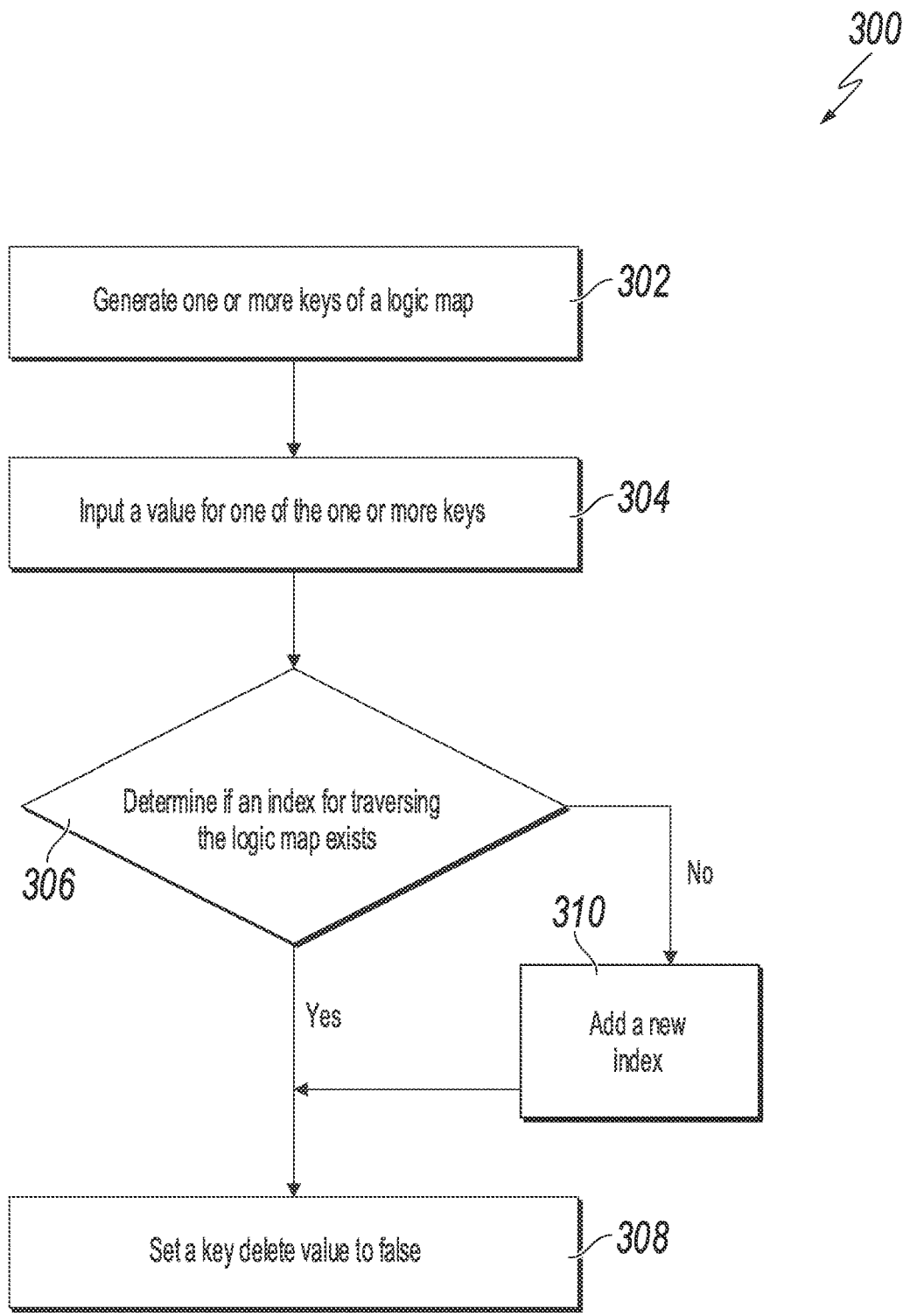
FIG. 3 depicts an example process of creating a logic map for traversing a MPT in accordance with implementations of the present disclosure.

FIG. 3 depicts an example process 300 of creating a logic map for traversing a MPT in accordance with implementations of the present disclosure. For clarity of presentation, the description that follows generally describes the example process 300 in the context of the other figures in this description. However, it will be understood that the example process 300 can be performed, for example, by any system, environment, software, and hardware, or a combination of systems, environments, software, and hardware, as appropriate. In some implementations, various steps of the example process 300 can be run in parallel, in combination, in loops, or in any order.

At 302, one or more keys of a logic map can be generated. The logic map can be used to traverse one or more KVPs included in an MPT. Referring to FIG. 4 for example, FIG. 4 depicts example KVPs 400 corresponding to an example logic map and an example MPT in accordance with implementations of the present disclosure. In this example 400, it is assumed that a logic map is created for traversing two selected KVPs of the MPT. Table 402 shows the logic KVPs of the MPT, which includes a first KVP with a key "Alice" and a corresponding value "22", and a second KVP with a key "Bob" and a corresponding value "23". Table 404 shows the actual form of the two KVPs stored in the smart contract database. As shown in table 404, the keys can be stored in the database as hash values.

To create a logic map with KVPs that can be used to traverse the two KVPs of the MPT, a plurality of KVPs of the map can be generated. For example, assume that the logic map is named "Dict_A," as shown in Table 406, a "Dict_A_KEY_VALUE_Alice" key can be generated to associate with the value "22," a "Dict_A_KEY_INDEX_Alice" key can be generated that corresponds to an index "1" assigned to the key "Alice" in table 402. Similarly, a "Dict_A_KEY_VALUE_Bob" key can be generated to associate with the value "23," a "Dict_A_KEY_INDEX_Bob" can be generated that corresponds to an index "2" assigned to the key "Bob" in table 402. Similar to the KVPs in the MPT, the keys of the KVPs in the logic map can be stored as hash values in actual smart contract databases as shown in table 408.

In some implementations, additional index keys can be generated for the logic map. The index keys can be associated with values that identify other keys in the logic map. For example, the keys "Dict_A_INDEX_KEY_1" and "Dict_A_INDEX_KEY_2" in table 406 can be associated with values "Alice" and "Bob". The values "Alice" and "Bob" can be used to identify other keys in the logic map such as "Dict_A_KEY_VALUE_Alice" and "Dict_A_KEY_ VALUE_Bob".

At 304, a value for one of the one or more keys can be input by a user that creates the map. For example, after generating the key "Dict_A_KEY_VALUE_Alice," a user can input the value "Alice" to associate with the key. The value can be a value of a KVP in the MPT that the user wants to include in the map.

At 306, whether an index for traversing the logic map exists can be determined. In some implementations, the determination can be based on whether the key (e.g., "Dict_A_KEY_INDEX_Alice") that corresponds to the index exists. If yes, the example process 300 proceeds to 308, where a key corresponds to a delete flag is set to a value "False". Referring again to FIG. 4 for example, if index value "1" exists, a key "Dict_A_KEY_DELETE_Alice" indicating whether the index corresponding to "Alice" is deleted can be set to the value "False". Similarly, if index value "2" exists, a key "Dict_A_KEY_DELETE_Bob" can be set to the value "False". Otherwise, the example process 300 depicted in FIG. 3 proceeds to 310.

At 310, a new index is added. In some implementations, to add a new index, another key of the map indicating all indices that have been added to the logic map can be created. For example, if the indices corresponding to "Alice" and "Bob" have been added to the logic map, the size of the logic map is two. Assume that the index "2" is deleted from the logic map, the size of the logic map is still two. Referring again to FIG. 4, an example key corresponding to the size of the logic map can be expressed as "Dict_A_SIZE," and its corresponding value is "2". If the index "2" is deleted, the size of the map can be increased by one to include a new index assigned to "Bob". For example, the key "Dict_A_KEY_INDEX_Bob" and the key "Dict_A_SIZE" can now correspond to the value "3". In comparison, the key "Dict_A_LENGTH" in table 406 can indicate the number of actual KVPs included in the logic map. Even if index "2" is deleted and the key "Dict_A_KEY_INDEX_Bob" now corresponds to the value "3," the "Dict_A_LENGTH" is still 2, because only two keys, "Alice" and "Bob," are mapped by the logic map. However, if the key "Dict_A_KEY_DELETE_Bob" corresponds to the value "False," and a new index is added to include another KVP in the logic map, the value of the key "Dict_A_LENGTH" can be increased by 1.

Example pseudo-code for creating a logic map in accordance with the description of example process 300 can be expressed as follows:

```
def imap_set(self, key, value):
if self[imap_key_index + key] not null :
key_index = self[imap_key_index + key]
self[imap_key_value + key] = value
if self[imap_index_deleted_flag + key_index] == True:
self[imap_index_deleted_flag + key_index] = False
self.imap_size += 1
else:
key_index = self.imap_length
self.imap_length = self.imap_length + 1
self[imap_key_index + key] = key_index
self[imap_index_key + key_index] = key
self[imap_key_value + key] = value
self[imap_index_deleted_flag + key_index] = False
self.imap_size += 1
```

Figure 5:
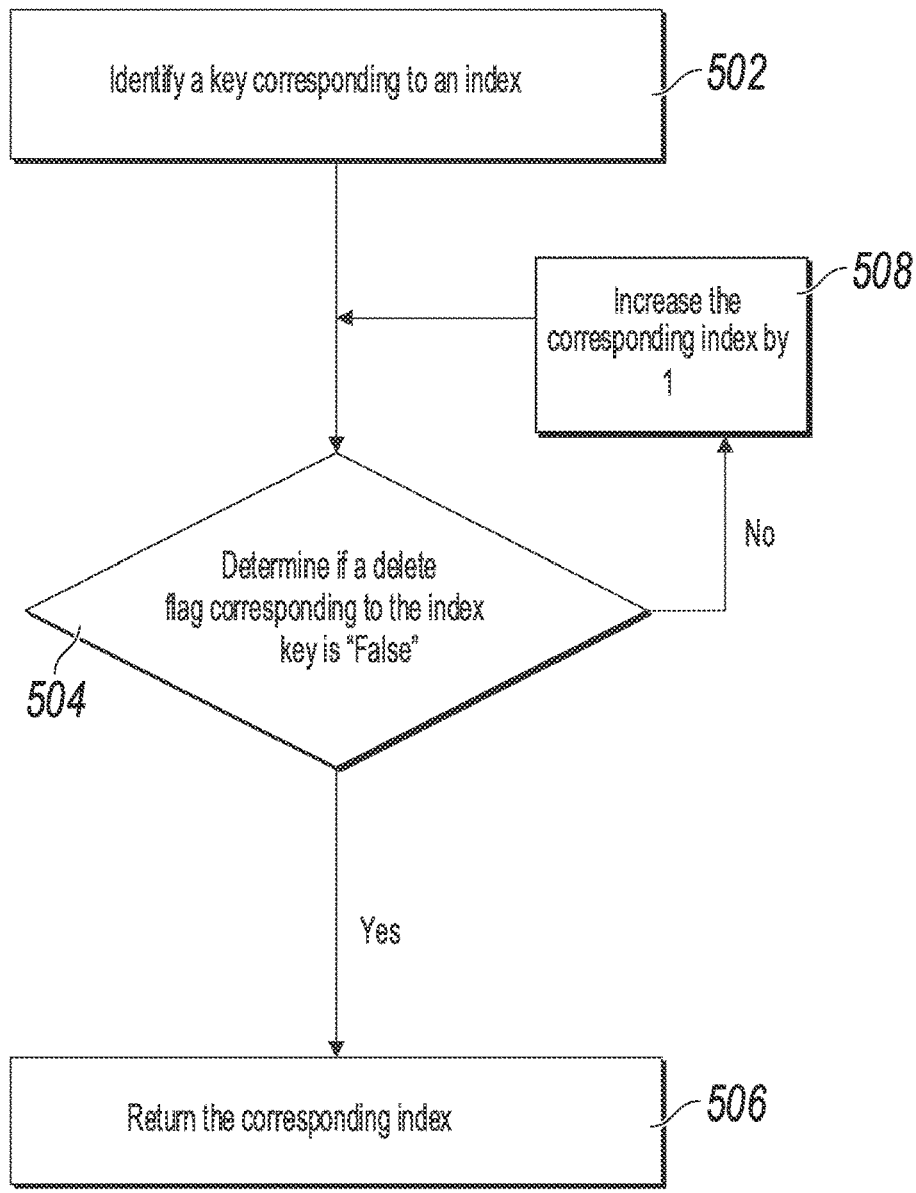
FIG. 5 depicts an example process of using a logic map for traversing a MPT in accordance with implementations of the present disclosure.

FIG. 5 depicts an example process 500 of using a logic map for traversing a MPT in accordance with implementations of the present disclosure. For clarity of presentation, the description that follows generally describes the example process 500 in the context of the other figures in this description. However, it will be understood that the example process 500 can be performed, for example, by any system, environment, software, and hardware, or a combination of systems, environments, software, and hardware, as appropriate. In some implementations, various steps of the example process 500 can be run in parallel, in combination, in loops, or in any order.

At 502, a key corresponding to an index is identified. In some implementations, KVPs in an MPT can be traversed through indices defined in the logic map. Using the logic map discussed in the descriptions of FIG. 3 and FIG. 4 as an example, index "1" can be used to identify the index key "Dict_A_INDEX_KEY_1". And a corresponding value "Alice" in table 406 of FIG. 4 can be returned. Example pseudo-code to return value based on the index key can be expressed as:

```
def imap_get_key_by_index(self, index):
key = self[imap_index_key + index]
return key
```

Based on the logic map shown in table 406 of FIG. 4, the value returned from "Dict_A_INDEX_KEY_1" is "Alice". The value "Alice" can then be used to identify the key, "Dict_A_KEY_VALUE_A," to retrieve the true value, "22," of "Alice" in the MPT. Example pseudo-code can be expressed as:

```
def imap_get_key_by_index(self, index):
key = self[imap_index_key + index]
return key
```

At 504, whether a delete flag corresponding to the index key is "False" is determined. A delete flag can indicate that an index key is not deleted when it is set as "False". Otherwise, it is set as "True." As discussed in the description of FIG. 3, if the delete flag is set as "False," the corresponding index is returned at 506. Otherwise, the delete flag indicates that the index key is deleted, and the example process 500 proceeds to 508, where the corresponding index is increased by "1". Referring to the example discussed in FIG. 4, and assuming that the example process 500 starts with index "1". If the delete flag is "False," it can be inferred that the index "1" is not deleted, the corresponding KVP of "Alice" and "22" can be retrieved based on the process as discussed in the description of 502. Otherwise, the index is increased to "2". If the delete flag corresponding to index "2" is "False," the corresponding KVP of "Bob" and "23" can be retrieved. Example pseudo-code for traversing the KVPs based on indices can be expressed as:

```
def imap_next_index(self, index):
index += 1
while index < self.imap_length:
if self[imap_index_deleted_flag + index] == False:
return index
else:
index += 1
return −1
```

In some implementations, a logic map can include a function to identify whether a key is included in the map. Example pseudo-code corresponding to the function can be expressed as:

```
def imap_contains(self, key):
if key in self.imap_key_index:
key_index = self[imap_key_index + key]
if self[imap_index_deleted_flag + key_index] == False:
return True
return False
```

In some implementations, a logic map can include a function to remove a KVP from a logic map. If a KVP is removed from the logic map, a delete flag can be set to "True," the corresponding value can be set to "None," and the "length" of the logic map can be reduced by one. Example pseudo-code corresponding to the remove function can be expressed as:

```
def imap_remove(self, key):
if key in self.imap_key_index:
self[imap_key_value + key] = None
key_index = self[imap_key_index + key]
self[imap_index_deleted_flag + key_index] = True
self.imap_length −= 1
```

Figure 6:
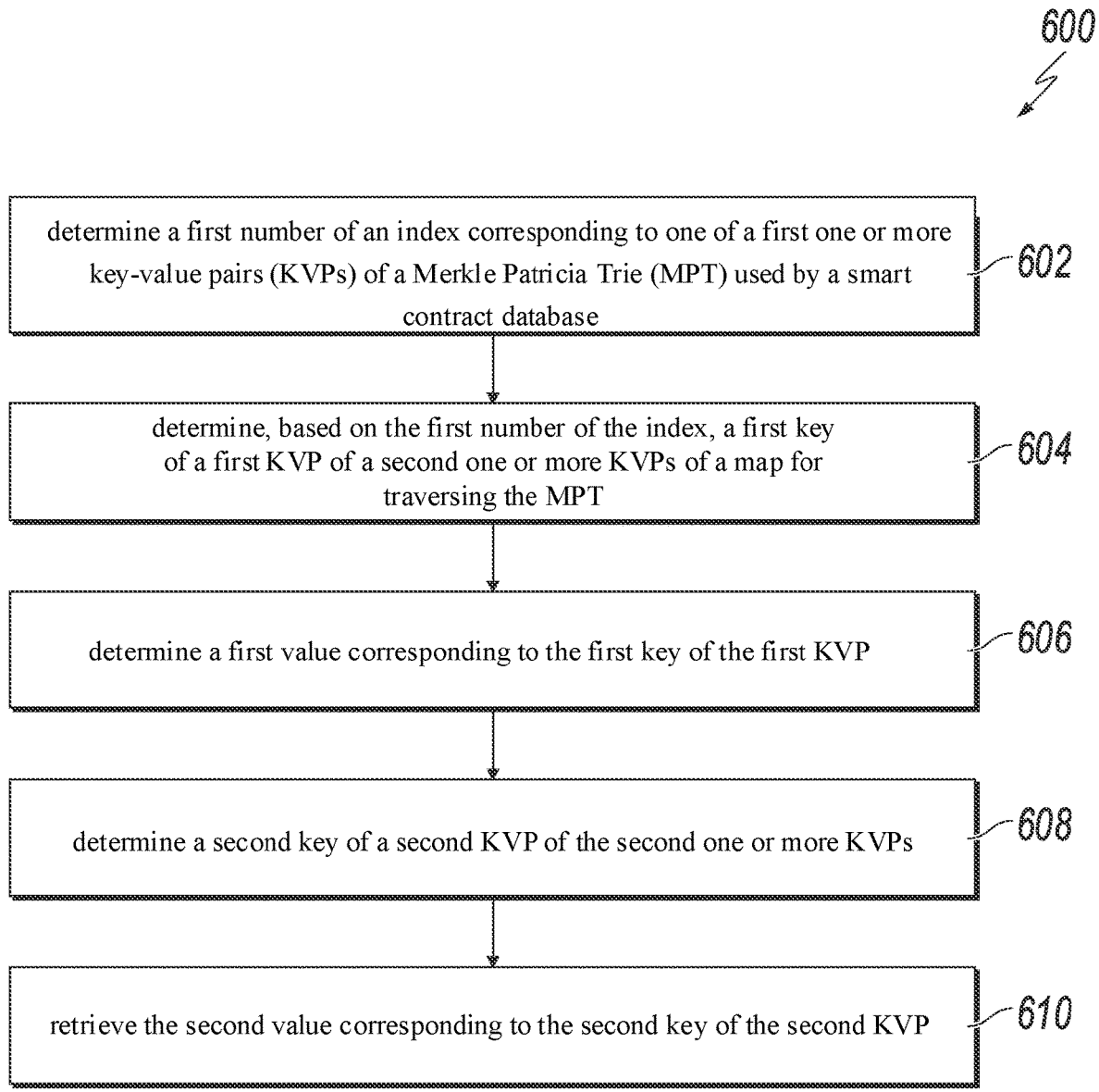
FIG. 6 depicts an example process of traversing a smart contract database in accordance with implementations of the present disclosure.

FIG. 6 depicts an example process of traversing a smart contract database in accordance with implementations of the present disclosure. For clarity of presentation, the description that follows generally describes the example process 600 in the context of the other figures in this description. However, it will be understood that the example process 600 can be performed, for example, by any system, environment, software, and hardware, or a combination of systems, environments, software, and hardware, as appropriate. In some implementations, various steps of the example process 600 can be run in parallel, in combination, in loops, or in any order.

At 602, a first number of an index corresponding to one of a first one or more KVPs of an MPT used by a smart contract database is determined.

At 604, a first key of a first KVP of a second one or more KVPs of a map for traversing the MPT is determined based on the first number of the index.

At 606, a first value corresponding to the first key of the first KVP is determined.

At 608, a second key of a second KVP of the second one or more KVPs is determined. In some implementations, a number of KVPs in the first one or more KVPs is less than or equal to a number of KVPs in the second one or more KVPs. In some implementations, keys of the first one or more KVPs and keys of the second one or more KVPs are stored as hash value. In some implementations, the second one or more KVPs include one or more values that are the same as one or more values included in the first one or more KVPs, and one or more values that are the same as one or more keys included in the first one or more KVPs. In some implementations, the second one or more KVPs include one or more values indicating numbers included in the index, one or more values indicating whether one of more of the first one or more KVPs are deleted, and a quantity of KVPs in the first one or more KVPs.

At 610, the second value corresponding to the second key of the second KVP is retrieved. In some examples, a third key of a third KVP of the second one or more KVPs can be determined based on a second number of the index, a third key of a third KVP of the second one or more KVPs. In some examples, the second number of the index can be determined to be not deleted. In some examples, a third value corresponding to the third key of the third KVP can be determined. In some examples, a fourth key of a fourth KVP of the fourth one or more KVPs can be determined. In some examples, the fourth value corresponding to the fourth key of the fourth KVP can be retrieved.

Implementations and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, implementations can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method of traversing a smart contract database, comprising:
    generating a logic map for traversing a Merkle Patricia Tree (MPT), the logic map comprising:
        a plurality of key-value pairs (KVPs) associated with the logic map (map KVPs), wherein a subset of the plurality of map KVPs represent operations available to be performed on one or more KVPs associated with the MPT (MPT KVPs), wherein the operations available to be performed comprise at least one of traversing, reading, or removing a KVP;
        a size of the logic map; and
        an index comprising a plurality of numbers, each number corresponding to an MPT KVP stored in the smart contract database or an MPT KVP that has been deleted from the smart contract database, wherein the MPT is used to store the MPT KVPs in the smart contract database, and wherein the index is created for an MPT KVP by steps comprising:
            determining a first number of the index of the logic map;
            traversing the logic map using the numbers of the index and determining that the MPT KVP is not stored in or deleted from the logic map;
            associating a next index number to the MPT KVP;
            storing the MPT KVP in the logic map in association with the next index number; and
            incrementing the size of the logic map;
        determining the first number of the index of the logic map corresponding to one of the plurality of MPT KVPs stored in the smart contract database;
        determining, based on the first number of the index, a first key of a first KVP of the plurality of map KVPs;
        determining a first value corresponding to the first key of the first KVP;
        determining a second key of a second KVP of the plurality of map KVPs, wherein the second KVP represents an operation available to be performed on one or more MPT KVPs;
    retrieving a second value corresponding to the second key of the second KVP;
    determining, based on a second number of the index, a third key of a third KVP of the plurality of map KVPs; and
    determining a third value corresponding to the third key of the third KVP.

2. The computer-implemented method of claim 1, further comprising:
    determining a fourth key of a fourth KVP of plurality of map KVPs; and
    retrieving a fourth value corresponding to the fourth key of the fourth KVP.

3. The computer-implemented method of claim 1, further comprising determining that the second number of the index is not deleted.

4. The computer-implemented method of claim 1, wherein a number of MPT KVPs in the one or more MPT KVPs is less than or equal to a number of map KVPs in the plurality of map KVPs.

5. The computer-implemented method of claim 1, wherein keys of the one or more MPT KVPs and keys of the plurality of map KVPs are stored as hash values.

6. The computer-implemented method of claim 1, wherein the plurality of map KVPs include one or more values that are the same as one or more values included in the one or more MPT KVPs, and one or more values that are the same as one or more keys included in the one or more MPT KVPs.

7. The computer-implemented method of claim 1, wherein the plurality of map KVPs include one or more values indicating numbers included in the index, one or more values indicating whether one of more of the one or more MPT KVPs are deleted, and a quantity of KVPs in the one or more MPT KVPs.

8. A non-transitory, computer-readable medium storing one or more instructions executable by a computer system to perform operations for traversing a smart contract database comprising:
 generating a logic map for traversing a Merkle Patricia Tree (MPT), the logic map comprising:
  a plurality of key-value pairs (KVPs) associated with the logic map (map KVPs), wherein a subset of the plurality of map KVPs represent operations available to be performed on one or more KVPs associated with the MPT (MPT KVPs), wherein the operations available to be performed comprise at least one of traversing, reading, or removing a KVP;
  a size of the logic map; and
  an index comprising a plurality of numbers, each number corresponding to an MPT KVP stored in the smart contract database or an MPT KVP that has been deleted from the smart contract database, wherein the MPT is used to store the MPT KVPs in the smart contract database, and wherein the index is created for an MPT KVP by steps comprising:
   determining a first number of the index of the logic map;
   traversing the logic map using the numbers of the index and determining that the MPT KVP is not stored in or deleted from the logic map;
   associating a next index number to the MPT KVP;
   storing the MPT KVP in the logic map in association with the next index number; and
   incrementing the size of the logic map;
  determining the first number of the index of the logic map corresponding to one of the plurality of MPT KVPs stored in the smart contract database;
  determining, based on the first number of the index, a first key of a first KVP of the plurality of map KVPs;
  determining a first value corresponding to the first key of the first KVP;
  determining a second key of a second KVP of the plurality of map KVPs, wherein the second KVP represents an operation available to be performed on one or more MPT KVPs;
  retrieving a second value corresponding to the second key of the second KVP;
  determining, based on a second number of the index, a third key of a third KVP of the plurality of map KVPs; and
  determining a third value corresponding to the third key of the third KVP.

9. The non-transitory, computer-readable medium of claim 8, the operations further comprising:
 determining a fourth key of a fourth KVP of plurality of map KVPs; and
 retrieving a fourth value corresponding to the fourth key of the fourth KVP.

10. The non-transitory, computer-readable medium of claim 8, the operations further comprising determining that the second number of the index is not deleted.

11. The non-transitory, computer-readable medium of claim 8, wherein a number of MPT KVPs in the one or more MPT KVPs is less than or equal to a number of map KVPs in the plurality of map KVPs.

12. The non-transitory, computer-readable medium of claim 8, wherein keys of the one or more MPT KVPs and keys of the plurality of map KVPs are stored as hash values.

13. The non-transitory, computer-readable medium of claim 8, wherein the plurality of map KVPs include one or more values that are the same as one or more values included in the one or more MPT KVPs, and one or more values that are the same as one or more keys included in the one or more MPT KVPs.

14. The non-transitory, computer-readable medium of claim 8, wherein the plurality of map KVPs include one or more values indicating numbers included in the index, one or more values indicating whether one of more of the one or more MPT KVPs are deleted, and a quantity of KVPs in the one or more MPT KVPs.

15. A system, comprising:
 one or more computers; and
 one or more computer-readable memories coupled to the one or more computers and having instructions stored thereon which are executable by the one or more computers to perform operations for traversing a smart contract database comprising:
 generating a logic map for traversing a Merkle Patricia Tree (MPT), the logic map comprising:
  a plurality of key-value pairs (KVPs) associated with the logic map (map KVPs), wherein a subset of the plurality of map KVPs represent operations available to be performed on one or more KVPs associated with the MPT (MPT KVPs), wherein the operations available to be performed comprise at least one of traversing, reading, or removing a KVP;
  a size of the logic map; and
  an index comprising a plurality of numbers, each number corresponding to an MPT KVP stored in the smart contract database or an MPT KVP that has been deleted from the smart contract database, wherein the MPT is used to store the MPT KVPs in the smart contract database, and wherein the index is created for an MPT KVP by steps comprising:
   determining a first number of the index of the logic map;
   traversing the logic map using the numbers of the index and determining that the MPT KVP is not stored in or deleted from the logic map;
   associating a next index number to the MPT KVP;
   storing the MPT KVP in the logic map in association with the next index number; and
   incrementing the size of the logic map;
  determining the first number of the index of the logic map corresponding to one of the plurality of MPT KVPs stored in the smart contract database;
  determining, based on the first number of the index, a first key of a first KVP of the plurality of map KVPs;
  determining a first value corresponding to the first key of the first KVP;
  determining a second key of a second KVP of the plurality of map KVPs, wherein the second KVP represents an operation available to be performed on one or more MPT KVPs;
  retrieving a second value corresponding to the second key of the second KVP;
  determining, based on a second number of the index, a third key of a third KVP of the plurality of map KVPs; and
  determining a third value corresponding to the third key of the third KVP.

16. The system of claim 15, the operations further comprising:
 determining a fourth key of a fourth KVP of plurality of map KVPs; and retrieving a fourth value corresponding to the fourth key of the fourth KVP.

17. The system of claim 15, the operations further comprising determining that the second number of the index is not deleted.

18. The system of claim 15, wherein a number of MPT KVPs in the one or more MPT KVPs is less than or equal to a number of map KVPs in the plurality of map KVPs.

19. The system of claim 15, wherein keys of the one or more MPT KVPs and keys of the plurality of map KVPs are stored as hash values.

20. The system of claim 15, wherein the plurality of map KVPs include one or more values that are the same as one or more values included in the one or more MPT KVPs, and one or more values that are the same as one or more keys included in the one or more MPT KVPs.

\* \* \* \* \*

UNITED STATES PATENT AND TRADEMARK OFFICE
CERTIFICATE OF CORRECTION

| | |
|---|---|
| PATENT NO. | : 11,403,344 B2 |
| APPLICATION NO. | : 16/390802 |
| DATED | : August 2, 2022 |
| INVENTOR(S) | : Dong Pan and Xiaorui Qiao |

It is certified that error appears in the above-identified patent and that said Letters Patent is hereby corrected as shown below:

In the Claims

In Column 13, Line 4, Claim 8, delete "corn puter-readable" and insert -- computer-readable --, therefor.

Signed and Sealed this
Eighth Day of November, 2022

Katherine Kelly Vidal
*Director of the United States Patent and Trademark Office*